(12) United States Patent
Celenza et al.

(10) Patent No.: US 8,208,237 B2
(45) Date of Patent: Jun. 26, 2012

(54) ADMINISTERING OFFSET VOLTAGE ERROR IN A CURRENT SENSING CIRCUIT

(75) Inventors: Nicholas Celenza, Durham, NC (US); Ismael Orozco Biaggi, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/242,031

(22) Filed: Sep. 30, 2008

(65) Prior Publication Data

US 2010/0078999 A1    Apr. 1, 2010

(51) Int. Cl.
H02H 3/08 (2006.01)
H02H 9/02 (2006.01)
(52) U.S. Cl. .................. 361/93.2; 361/93.1
(58) Field of Classification Search .............. 361/93.1, 361/93.2
See application file for complete search history.

(56) References Cited

U.S. PATENT DOCUMENTS

| 4,720,758 | A | * | 1/1988 | Winslow .............. 361/93.7 |
| 6,184,665 | B1 | | 2/2001 | Salina et al. |
| 7,106,569 | B2 | * | 9/2006 | Liu et al. .............. 361/93.1 |
| 7,138,775 | B2 | * | 11/2006 | Sugimoto et al. .......... 318/140 |
| 7,138,819 | B2 | * | 11/2006 | Hashimoto .......... 324/762.02 |
| 2006/0136759 | A1 | | 6/2006 | Koo |

FOREIGN PATENT DOCUMENTS

EP    1 588 928 A2    10/2005

* cited by examiner

Primary Examiner — Rexford Barnie
Assistant Examiner — Christopher Clark
(74) Attorney, Agent, or Firm — Edward J. Lenart; Cynthia G. Seal; Biggers & Ohanian, LLP.

(57) ABSTRACT

Administering offset voltage error in a current sensing circuit including recording by a power supply management module a current sensing voltage for a power supply when no operating load is drawn from the power supply and dynamically calculating by the power supply management module output current of the power supply with an active load in dependence upon the recorded current sensing voltage.

15 Claims, 4 Drawing Sheets

ADMINISTERING OFFSET VOLTAGE ERROR IN A CURRENT SENSING CIRCUIT

BACKGROUND OF THE INVENTION

1. Field of the Invention

The field of the invention is data processing, or, more specifically, methods, apparatus, and products for administering offset voltage error in a current sensing circuit.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems may include many various components with various current draws on a power supply. Present power supplies may be configured with several channels, each of which delivers power to a separate load. In some computer systems a current sensing circuit is employed to sense the output current of such a power supply in order to provide over-current protection for the computer system and increase power efficiency of the computer system. In present art, calculations of such an output current of a power supply based upon values provided by a current sensing circuit are somewhat inaccurate. Increasing accuracy in calculating such an output current provides greater efficiency in over-current protection for the computer system, greater efficiency of operation of the computer system through power management techniques, and other benefits.

SUMMARY OF THE INVENTION

Methods, apparatus, and products for administering offset voltage error in a current sensing circuit, including recording by a power supply management module a current sensing voltage for a power supply when no operating load is drawn from the power supply; and dynamically calculating by the power supply management module output current of the power supply with an active load in dependence upon the recorded current sensing voltage. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
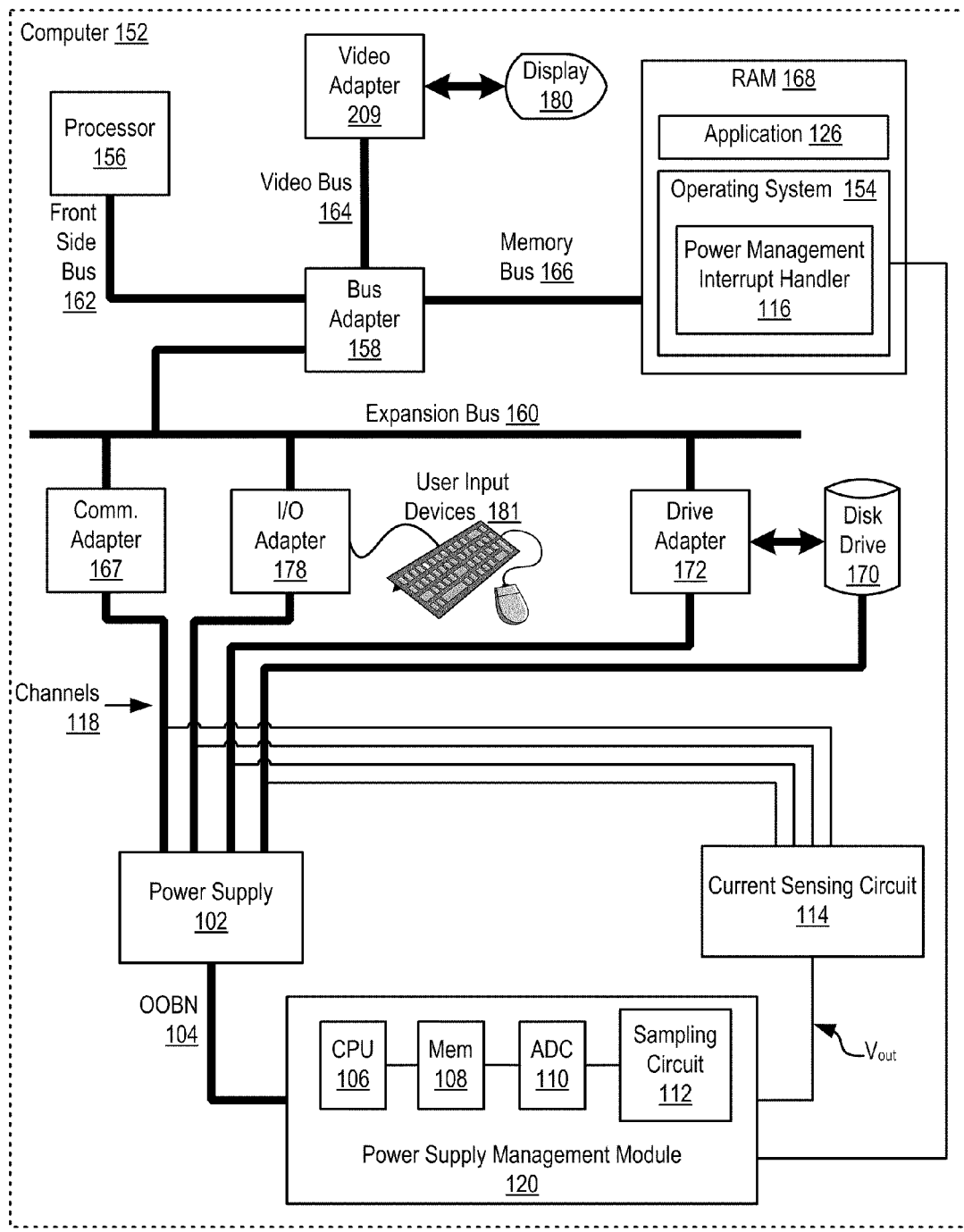
FIG. 1 sets forth a block diagram of automated computing machinery comprising an exemplary computer useful in administering offset voltage error in a current sensing circuit according to embodiments of the present invention.

Exemplary methods, apparatus, and products for administering offset voltage error in a current sensing circuit in accordance with the present invention are described with reference to the accompanying drawings, beginning with FIG. 1. FIG. 1 sets forth a block diagram of automated computing machinery comprising an exemplary computer (152) useful in administering offset voltage error in a current sensing circuit (114) according to embodiments of the present invention. A current sensing circuit (114) as the term is used in this specification is an aggregation of electrical components and software capable of 'sensing,' an output current of a power supply in terms of a current sensing voltage that varies with respect to the output current or currents of the power supply. The current sensing voltage then may be used to calculate the output current. In such a current sensing circuit (114), an offset voltage, a specified voltage within the current sensing circuit, is used to provide accuracy in current sensing when the current is relatively small. The specified offset voltage, however, may vary in the current sensing circuit. Such a variance is characterized in this specification as an offset voltage error. In some current sensing circuits (114) configured according to embodiments of the present invention, for example, the typical offset voltage error is 5 percent while the specified offset voltage is 0.4 volts ('V'). Such an error may introduce inaccuracies in current sensing.

The current sensing circuit (114) of FIG. 1 is configured to sense the output current of the power supply (102). The power supply of FIG. 1 delivers power to several components of the computer (152). The power supply (102) in the example of FIG. 1 delivers power through several channels (118), where each channel delivers power to a separate load. In the example of FIG. 1, the power supply delivers power through one channel (118) to a communications adapter (167), through another channel (118) to an input/output ('I/O') adapter (178), through another channel (118) to a disk drive adapter (172), and through yet another channel (118) to a disk drive (170). Readers of skill in the art will recognize that power supplies (102) useful in systems that administer offset voltage errors in current sensing circuits according to embodiments of the present invention may include any number of channels (118) for delivering power to various loads in a computer.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an application program (126), a module of computer program instructions for user-level data processing tasks. Examples of such application programs include word processors, spreadsheet applications, multimedia display applications, and so on as will occur to readers of skill in the art. Also stored in RAM (168) is an operating system (154). Operating systems useful administering offset voltage error in a current sensing circuit according to embodiments of the present invention include UNIX™, Linux™, Microsoft XP™, AIX™, IBM's i5/OS™, and others as will occur to those of skill in the art. The operating system (154) and application program (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for administering offset voltage error in a current sensing circuit according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers and for data communications with data communications networks. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administering offset voltage error in a current sensing circuit according to embodiments of the present invention include modems for wired dial-up communications, Ethernet (IEEE 802.3) adapters for wired data communications network communications, and 802.11 adapters for wireless data communications network communications.

The exemplary computer (152) of FIG. 1 also includes a power supply management module (120), an aggregation of computer hardware and software that operates generally for administering offset voltage error in a current sensing circuit according to embodiments of the present invention. The power supply management module (120) of FIG. 1 operates for administering offset voltage error in the current sensing circuit (114) by recording a current sensing voltage ($V_{out}$) for the power supply (102) when no operating load is drawn from the power supply and dynamically calculating output current of the power supply (120) with an active load in dependence upon the recorded current sensing voltage. The power supply management module (120) may record the current sensing voltage ($V_{out}$) by sampling the current sensing voltage in analog form through use of the sampling circuit (112) of the module (120), converting the sampled analog voltage to digital form through use of the analog to digital converter ('ADC') (110), and storing the digital representation of the current sensing voltage in computer memory (108) which may be implemented as RAM, EEPROM, Flash, or some other type of memory. All such operation may be executed by the Central Processing Unit ('CPU') of the power supply management module (120) which may be implemented as a standalone processor, a microcontroller, or an Application Specific Integrated Circuit ('ASIC') or System-on-a-chip ('SoC').

The example power supply management module (120) of FIG. 1 may also determine whether the calculated output current of the power supply is greater than a predetermined threshold. The predetermined threshold may be set for over-current protection of the various components of the computer system powered by the power supply. If the calculated output current of the power supply is greater than the predetermined threshold, the power supply management module (120) may trigger an over-current fault in the power supply. The power supply management module (120) may trigger an over-current fault in the power supply by asserting a signal on the out-of-band network (104) connecting the power supply management module (120) to the power supply (102) for data communications. Such an out-of-band network may be implemented as a Universal Serial Bus ('USB'), a Peripheral Component Interface ('PCI') link, an Inter-Integrated circuit ('I²C') bus, a System Management Bus ('SMB'), or other data communications connection as will occur to readers of skill in the art. In some embodiments, if the calculated output current of the power supply (102) is greater than the predetermined threshold, the power supply management module (120) triggers an interrupt in an operating system (154) executing on the computer (152) where the interrupt invokes a power management interrupt handler (116) in the operating system. The power supply management module (120) may trigger an interrupt in an operating system (154) by storing an interrupt type code in a register or other memory locations designated for such a purpose and asserting a signal on a wire, a hardware interrupt. The operating system (154), or a general interrupt handler, identifies the interrupt type code and executes the corresponding interrupt handler, in this example, the power management interrupt handler (116). The power management interrupt handler (116) is a module of computer program instructions configured for power management in dependence upon over-current faults of the power supply. The power management interrupt handler (116) may be capable of throttling the clock speed of the processor (156), throttling the clock speed of the memory bus (166), disabling I/O devices, modifying the computer's global states, and so on. An example of a module that may be configured to operate as a power management interrupt handler is an Advance Configuration and Power Interface ('ACPI') module of an operating system.

The arrangement of adapters, processors, power supply (102), current sensing circuit (114), power supply management module (120), and other devices making up the exemplary computer illustrated in FIG. 1 are for explanation, not for limitation. Computers useful according to various embodiments of the present invention may include additional adapters, power supplies, I/O devices, memory modules, data communications busses, and other devices, not shown in FIG. 1, as will occur to those of skill in the art. Networks connecting such computers to other data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
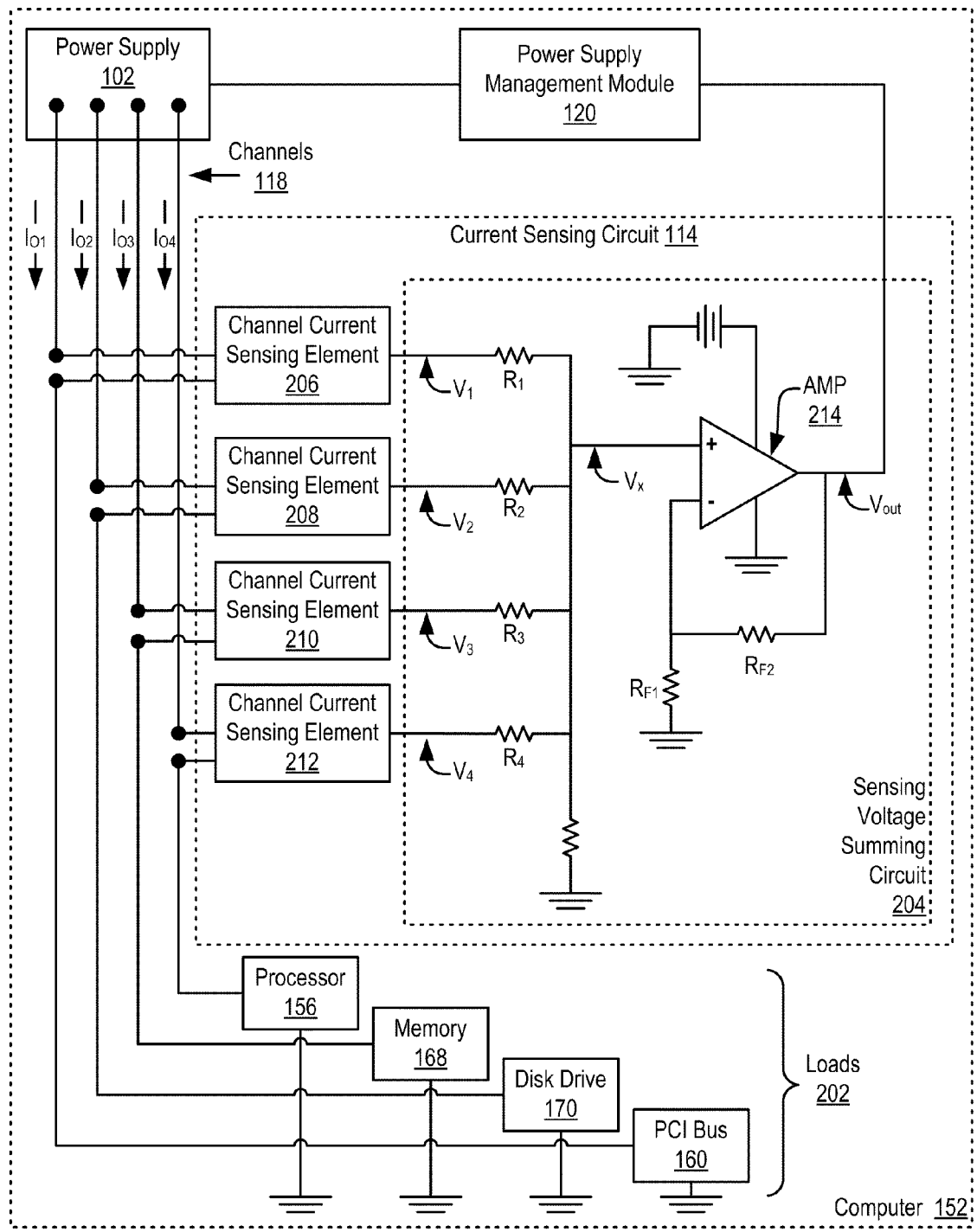
FIG. 2 sets forth a block diagram of automated computing machinery comprising a further exemplary computer useful in administering offset voltage error in a current sensing circuit according to embodiments of the present invention.

For further explanation, FIG. 2 sets forth a block diagram of automated computing machinery comprising a further exemplary computer (152) useful in administering offset voltage error in a current sensing circuit (114) according to embodiments of the present invention. The computer (152) in the example of FIG. 2 is similar to the computer in the example of FIG. 1, including as it does, a current sensing circuit (114) configured to sense current of a power supply (102) have several channels (118) that deliver power to individual loads (202), components of the computer, and a power supply management module (120) configured to record a current sensing voltage ($V_{out}$) for the power supply (102) when no operating load (202) is drawn from the power supply (102) and dynamically calculate output current of the power supply (102) with an active load in dependence upon the recorded current sensing voltage. Each channel of the power supply (102) in the example of FIG. 2 delivers power to a separate load (202) including a processor (156), a memory subsystem (168), a disk drive (170), and a PCI bus (160). Each channel therefore may have varying current draws under an active load.

The power supply management module (120) may record the current sensing voltage ($V_{out}$) for the power supply (102) when no operating load is drawn form the power supply in various ways such as, for example, at the time of manufacturer prior to installation and electrical connection of one or more loads (202), at startup of the computer (152) during a Basic Input/Output System ('BIOS') boot-time routine that operates a Field-Effect Transistor ('FET') or some other switching device in the channel current sensing elements to disconnect the loads from the power supply, or in other ways as may occur to readers of skill in the art.

The example current sensing circuit (114) of FIG. 2 includes a four channel current sensing elements (206, 208, 210, 212), one for each channel (118) of the power supply, and a sensing voltage summing circuit (204). The sensing voltage summing circuit (204) is configured to sum the current sensing voltage for each channel (118). The sensing voltage summing circuit (204) in the example of FIG. 2 includes a summing network of resistors ($R_1$, $R_2$, $R_3$, $R_4$) coupling the current sensing elements (206, 208, 210, 212) to an input of a current sensing amplifier (214) having a gain. The summing network of resistors provides a voltage $V_X$ as an input into the amplifier (214). The amplifier (214) is depicted as an operational amplifier, such as National Semiconductor's™ LM741 Op-Amp, for clarity of explanation only. Readers of skill in the art will recognize that any aggregation of electrical components that applies a gain to the input voltage ($V_x$) may be used, such as for example, an aggregation of Metal-oxide-Semiconductor Field-Effect Transistors ('MOSFETs'), an aggregation of Bipolar junction Transistors ('BJTs'), and the so on.

Each channel current sensing element (206, 208, 210, 212) is a device configured to represent the output current of its corresponding channel ($I_{O1}$, $I_{O2}$, $I_{O3}$, $I_{O4}$) as a channel sensing voltage ($V_1$, $V_2$, $V_3$, $V_4$). One example of a channel current sensing element (206, 208, 210, 212) which may be configured for use in current sensing circuits (114) configured according to embodiments of the present invention includes the 12 V High-Side Hot-Swap Hall Effect Based Current Monitor manufactured by Allegro™ MicroSystems, Inc. having a part number of ACS760ELF-20B. In the example of FIG. 2, one component of each channel sensing voltage is the previously described offset voltage which may include some amount of error. In current sensing circuits (114) that include channel current sensing elements implemented as Allegro's ACS760ELF-20B Current Monitor, for example, the output current of a channel is calculated in accordance with:

$$V_n = (0.065 \text{ Volts/Amp}) I_{On} + 0.4 \text{ Volts}, \quad (1)$$

where $V_n$ is the current sensing voltage for channel n, $I_{On}$ is the current of the channel n, and 0.4 is the specified offset voltage. As mentioned above, the specified offset voltage may not be exactly 0.4 volts, but may instead include some amount of error.

The output voltage ($V_{out}$) of the amplifier (214) in the sensing voltage summing circuit (204) is the current sensing voltage for the entire power supply (102) and may be used by the power supply management module (120) to calculate total output current of the power supply (102). The power supply management module (120) may calculate the total output current of the power supply in accordance with:

$$I_{out} = A(V_{Load} - V_{noLoad}), \quad (2)$$

where $I_{out}$ is the calculated output current, A is the gain of the current sensing amplifier (214), $V_{Load}$ is the current sensing voltage for the power supply operating with an active load, and $V_{noLoad}$ is the current sensing voltage recorded when no operating load is drawn from the power supply. The gain (A) of the current sensing amplifier for current sensing circuits (114) including channel current sensing elements implemented with Allegro's ACS760ELF-20B Current Monitor is:

$$A = \frac{n+1}{0.065} * \frac{R_{F1}}{R_{F1} + R_{F2}}, \quad (3)$$

where n is the number of channels (118) of the power supply, $R_{F1}$ is a first feedback resistor of the amplifier (214), and $R_{F2}$ is a second feedback resistor of the amplifier.

Using the current sensing voltage recorded with no load ($V_{noLoad}$) to calculate the total output current ($I_{out}$) of the power supply (102) reduces offset voltage errors in the calculation of the total output current because the current sensing voltage recorded with no load ($V_{noLoad}$) replaces a component of equation (2) that would otherwise be calculated, not measured, in dependence upon a specified value of the offset voltage without regard to the error of the offset voltage. Consider for further explanation, a prior art current sensing circuit implemented with Allegro's ACS760ELF-20B Current Monitor. In such an implementation, instead of using a recorded current sensing voltage with no load to calculate the output current of power supply (102), the component of the equation (2) now represented by the variable $V_{noLoad}$, was calculated in accordance with:

$$0.4 \frac{n}{n+1} \frac{R_{F1} + R_{F2}}{R_{F1}}, \quad (4)$$

Where 0.4 is the assumed value of the offset voltage, n is the number of channels (118) of the power supply (102), $R_{F1}$ is a first feedback resistor of the amplifier (214), and $R_{F2}$ is a second feedback resistor of the amplifier. Using such a calculated value as the component represented by $V_{noLoad}$ in equation (2) above, ignores any possible variation in the offset voltage, when in fact some variation may, and typically does, exist in the offset voltage. Calculating the output current using the recorded current sensing voltage with no load instead of the prior art component that includes an assumed value of the offset voltage, however, effectively reduces inaccuracies in current sensing caused by offset voltage error. That is, the recorded value of current sensing voltage, measured not calculated, includes any offset voltage error and as such takes such error into account when calculating output current of the power supply.

Figure 3:
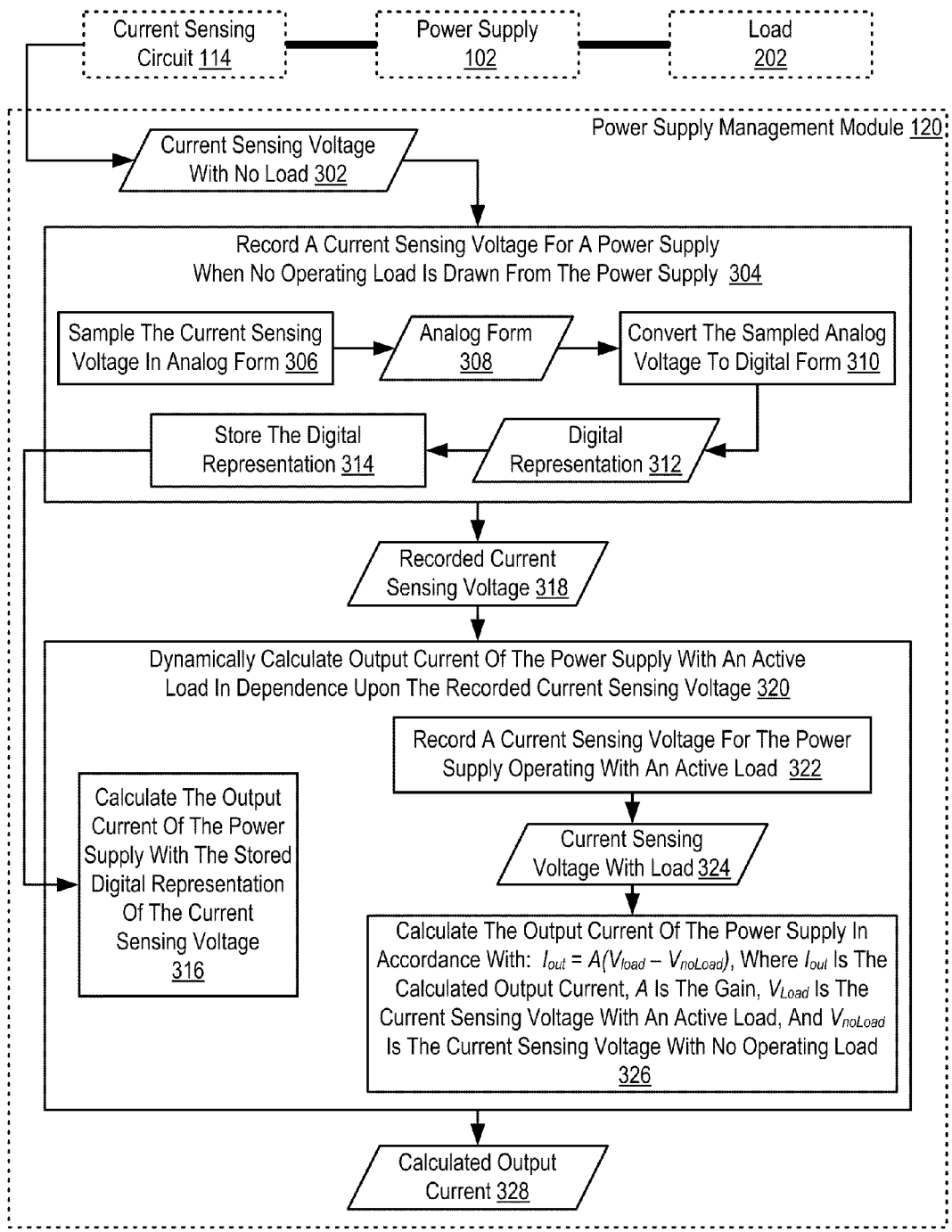
FIG. 3 sets forth a flow chart illustrating an exemplary method for administering offset voltage error in a current sensing circuit according to embodiments of the present invention.

For further explanation, FIG. 3 sets forth a flow chart illustrating an exemplary method for administering offset voltage error in a current sensing circuit according to embodiments of the present invention. The method of FIG. 3 includes recording (304) by a power supply management module (120) a current sensing voltage (302) for a power supply (102) when no operating load (202) is drawn from the power supply (102) and dynamically calculating (320) by the power supply management module (120) output current (328) of the power supply (102) with an active load (202) in dependence upon the recorded current sensing voltage (318). Calculating (320) the output current (328) of the power supply (102) is described in this specification as being carried out dynamically, that is, during operation of the power supply at any time as may occur to readers of skill in the art.

In the method of FIG. 3, recording (304) by a power supply management module (120) a current sensing voltage (302) for a power supply (102) when no operating load (202) is drawn from the power supply (102) may include sampling (306) the current sensing voltage in analog form (308), converting the sampled analog form (308) of the current sensing voltage to a digital representation (312), and storing the digital representation (312) of the current sensing voltage (302). In the method of FIG. 3, calculating (320) by the power supply management module (120) output current (328) of the power supply (102) with an active load includes calculating (316) the output current (328) of the power supply (102) with the stored digital representation (312) of the current sensing voltage (302).

As described above in detail, current sensing circuits (114) configured for administering offset voltage errors according to embodiments of the present invention may include a summing network of resistors coupling current sensing elements to an input of a current sensing amplifier having a gain, with the current sensing voltage taken from an output of the current sensing amplifier. In embodiments including current sensing circuit (114) configured as such, dynamically calculating (320) by the power supply management module (120) output current (328) of the power supply (102) with an active load (202) includes recording (322) a current sensing voltage (324) for the power supply (102) operating with an active load (202) and calculating (328) the output current (328) of the power supply (102) in accordance with:

$$I_{out}=A(V_{Load}-V_{noLoad}),\quad(5)$$

where $I_{out}$ is the calculated output current (328), A is the gain of the current sensing amplifier, $V_{Load}$ is the current sensing voltage for the power supply (102) operating with an active load (202), and $V_{noLoad}$ is the current sensing voltage recorded when no operating load (202) is drawn from the power supply (102). Recording (322) a current sensing voltage (324) for the power supply (102) operating with an active load (202) may include sampling the current sensing voltage in analog form when the power supply is operating with an active load, converting the sampled analog form of the current sensing voltage to a digital representation, and storing the digital representation (312) of the current sensing voltage.

Figure 4:
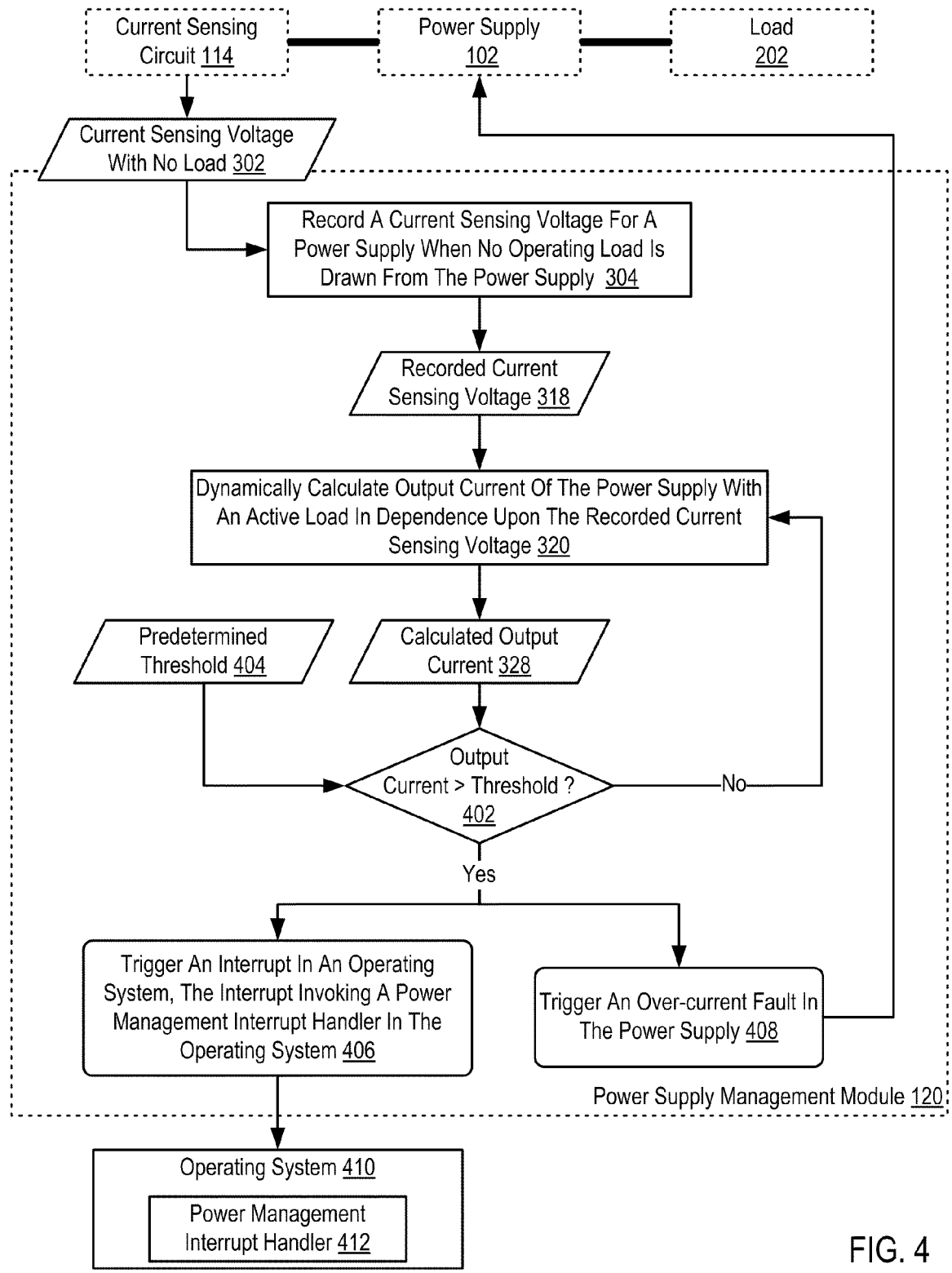
FIG. 4 sets forth a flow chart illustrating a further exemplary method for administering offset voltage error in a current sensing circuit according to embodiments of the present invention.

For further explanation, FIG. 4 sets forth a flow chart illustrating a further exemplary method for administering offset voltage error in a current sensing circuit according to embodiments of the present invention. The method of FIG. 4 is similar to the method of FIG. 3, including as it does, the power supply management module's (120) recording (304) a current sensing voltage (302) for a power supply (102) when no operating load (202) is drawn from the power supply (102) and dynamically calculating (320) output current (328) of the power supply (102) with an active load (202) in dependence upon the recorded current sensing voltage (318).

The method of FIG. 4 differs from the method of FIG. 3, however, in that the method of FIG. 4 includes determining (402) by the power supply management module (120) whether the calculated output current (328) of the power supply (102) is greater than a predetermined threshold (404). Determining (402) by the power supply management module (120) whether the calculated output current (328) of the power supply (102) is greater than a predetermined threshold (404) may include comparing the calculated output current (328) to a user-specified or manufacturer-specified over-current trip point.

If the calculated output current (328) of the power supply (102) is not greater than the predetermined threshold (404), the power supply management module (120) continues to dynamically calculate (320) output current (328) of the power supply (102) with an active load (202). If, however, the calculated output current (328) of the power supply (102) is greater than the predetermined threshold (404), the power supply management module (120) may trigger (408), by the power supply management module (120), an over-current fault in the power supply (102) or trigger (406) an interrupt in an operating system (410) executing on a computer powered by the power supply (102) with the interrupt invoking a power management interrupt handler (412) in the operating system (410).

Exemplary embodiments of the present invention are described largely in the context of a fully functional computer systems and electrical circuitry for administering offset voltage error in a current sensing circuit. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering offset voltage error in a current sensing circuit, the method comprising:
    recording by a power supply management module a current sensing voltage for a power supply when no operating load is drawn from the power supply, wherein:
        the power supply further comprises a plurality of independent power output channels, each channel configured to deliver power to a separate active load;
        each channel is characterized by a separate current sensing element that represents the output current of the channel as a channel sensing voltage; and
        the current sensing circuit further comprises a summing amplifier configured to sum the channel sensing voltages of the channels; and
    dynamically calculating by the power supply management module output current of the power supply with an active load in dependence upon the recorded current sensing voltage.

2. The method of claim 1 wherein:
    recording a current sensing voltage for a power supply when no operating load is drawn from the power supply further comprises sampling the current sensing voltage in analog form, converting the sampled analog form of the current sensing voltage to a digital representation, and storing the digital representation of the current sensing voltage; and
    calculating output current of the power supply with an active load further comprises calculating the output current of the power supply with the stored digital representation of the current sensing voltage.

3. The method of claim 1 wherein:
    the current sensing circuit comprises a summing network of resistors coupling current sensing elements to an input of a current sensing amplifier having a gain, with the current sensing voltage taken from an output of the current sensing amplifier; and
    dynamically calculating output current of the power supply with an active load in dependence upon the recorded current sensing voltage further comprises recording a current sensing voltage for the power supply operating with an active load and calculating the output current of the power supply in accordance with:

$$I_{out}=A(V_{Load}-V_{noLoad}),$$

where $I_{out}$ is the calculated output current, A is the gain of the current sensing amplifier, $V_{Load}$ is the current sensing voltage for the power supply operating with an active load, and $V_{noLoad}$ is the current sensing voltage recorded when no operating load is drawn from the power supply.

4. The method of claim 1 further comprising:
    determining by the power supply management module whether the calculated output current of the power supply is greater than a predetermined threshold; and
    if the calculated output current of the power supply is greater than the predetermined threshold, triggering, by the power supply management module, an over-current fault in the power supply.

5. The method of claim 1 further comprising:
    determining, by the power supply management module, whether the calculated output current of the power supply is greater than a predetermined threshold; and
    if the calculated output current of the power supply is greater than the predetermined threshold, triggering an interrupt in an operating system executing on a computer powered by the power supply, the interrupt invoking a power management interrupt handler in the operating system.

6. An apparatus for administering offset voltage error in a current sensing circuit, the apparatus comprising a computer processor, a computer memory operatively coupled to the computer processor, the computer memory having disposed within it computer program instructions capable of:
    recording by a power supply management module a current sensing voltage for a power supply when no operating load is drawn from the power supply, wherein:
        the power supply further comprises a plurality of independent power output channels, each channel configured to deliver power to a separate active load;
        each channel is characterized by a separate current sensing element that represents the output current of the channel as a channel sensing voltage; and
        the current sensing circuit further comprises a summing amplifier configured to sum the channel sensing voltages of the channels; and
    dynamically calculating by the power supply management module output current of the power supply with an active load in dependence upon the recorded current sensing voltage.

7. The apparatus of claim 6 wherein:
    recording a current sensing voltage for a power supply when no operating load is drawn from the power supply further comprises sampling the current sensing voltage in analog form, converting the sampled analog form of the current sensing voltage to a digital representation, and storing the digital representation of the current sensing voltage; and
    calculating output current of the power supply with an active load further comprises calculating the output current of the power supply with the stored digital representation of the current sensing voltage.

8. The apparatus of claim 6 wherein:
    the current sensing circuit comprises a summing network of resistors coupling current sensing elements to an input of a current sensing amplifier having a gain, with the current sensing voltage taken from an output of the current sensing amplifier; and
    dynamically calculating output current of the power supply with an active load in dependence upon the recorded current sensing voltage further comprises recording a current sensing voltage for the power supply operating with an active load and calculating the output current of the power supply in accordance with:

$$I_{out}=A(V_{Load}-V_{noLoad}),$$

where $I_{out}$ is the calculated output current, A is the gain of the current sensing amplifier, $V_{Load}$ is the current sensing voltage for the power supply operating with an active load, and $V_{noLoad}$ is the current sensing voltage recorded when no operating load is drawn from the power supply.

9. The apparatus of claim 6 further comprising computer program instructions capable of:
    determining by the power supply management module whether the calculated output current of the power supply is greater than a predetermined threshold; and if the calculated output current of the power supply is greater than the predetermined threshold, triggering, by the power supply management module, an over-current fault in the power supply.

10. The apparatus of claim 6 further comprising computer program instructions capable of:
determining, by the power supply management module, whether the calculated output current of the power supply is greater than a predetermined threshold; and
if the calculated output current of the power supply is greater than the predetermined threshold, triggering an interrupt in an operating system executing on a computer powered by the power supply, the interrupt invoking a power management interrupt handler in the operating system.

11. A computer program product for administering offset voltage error in a current sensing circuit, the computer program product disposed in a recordable computer readable storage medium, the computer program product comprising computer program instructions capable of:
recording by a power supply management module a current sensing voltage for a power supply when no operating load is drawn from the power supply, wherein:
the power supply further comprises a plurality of independent power output channels, each channel configured to deliver power to a separate active load;
each channel is characterized by a separate current sensing element that represents the output current of the channel as a channel sensing voltage; and
the current sensing circuit further comprises a summing amplifier configured to sum the channel sensing voltages of the channels; and
dynamically calculating by the power supply management module output current of the power supply with an active load in dependence upon the recorded current sensing voltage.

12. The computer program product of claim 11 wherein:
recording a current sensing voltage for a power supply when no operating load is drawn from the power supply further comprises sampling the current sensing voltage in analog form, converting the sampled analog form of the current sensing voltage to a digital representation, and storing the digital representation of the current sensing voltage; and
calculating output current of the power supply with an active load further comprises calculating the output current of the power supply with the stored digital representation of the current sensing voltage.

13. The computer program product of claim 11 wherein:
the current sensing circuit comprises a summing network of resistors coupling current sensing elements to an input of a current sensing amplifier having a gain, with the current sensing voltage taken from an output of the current sensing amplifier; and
dynamically calculating output current of the power supply with an active load in dependence upon the recorded current sensing voltage further comprises recording a current sensing voltage for the power supply operating with an active load and calculating the output current of the power supply in accordance with:

$$I_{out}=A(V_{Load}-V_{noLoad}),$$

where $I_{out}$ is the calculated output current, A is the gain of the current sensing amplifier, $V_{Load}$ is the current sensing voltage for the power supply operating with an active load, and $V_{noLoad}$ is the current sensing voltage recorded when no operating load is drawn from the power supply.

14. The computer program product of claim 11 further comprising computer program instructions capable of:
determining by the power supply management module whether the calculated output current of the power supply is greater than a predetermined threshold; and
if the calculated output current of the power supply is greater than the predetermined threshold, triggering, by the power supply management module, an over-current fault in the power supply.

15. The computer program product of claim 11 further comprising computer program instructions capable of:
determining, by the power supply management module, whether the calculated output current of the power supply is greater than a predetermined threshold; and
if the calculated output current of the power supply is greater than the predetermined threshold, triggering an interrupt in an operating system executing on a computer powered by the power supply, the interrupt invoking a power management interrupt handler in the operating system.

* * * * *